United States Patent [19]
Holmgren

[11] Patent Number: 5,588,315
[45] Date of Patent: Dec. 31, 1996

[54] SAFETY DEVICE FOR A BOX

[75] Inventor: Bertil Holmgren, Vellinge, Sweden

[73] Assignee: M W Trading APS, Denmark

[21] Appl. No.: 307,748

[22] PCT Filed: Mar. 23, 1993

[86] PCT No.: PCT/SE93/00241

§ 371 Date: Sep. 22, 1994

§ 102(e) Date: Sep. 22, 1994

[87] PCT Pub. No.: WO93/19268

PCT Pub. Date: Sep. 30, 1993

[30] Foreign Application Priority Data

Mar. 24, 1992 [SE] Sweden ............................ 9200902

[51] Int. Cl.⁶ .................................................. E05B 65/00
[52] U.S. Cl. .................................. 70/57.1; 70/58; 70/63; 70/276; 206/1.5
[58] Field of Search ............................. 70/57.1, 63, 57, 70/58, 276; 206/1.5, 308.2, 387.11

[56] References Cited

U.S. PATENT DOCUMENTS

| | | | |
|---|---|---|---|
| 2,093,926 | 9/1937 | Pratt | 292/87 X |
| 4,673,100 | 6/1987 | Reis et al. | 292/87 X |
| 4,964,661 | 10/1990 | Cadwell et al. | 292/87 |
| 5,147,034 | 9/1992 | Broadhead et al. | 206/1.5 |
| 5,215,189 | 6/1993 | Weisburn et al. | 206/1.5 |
| 5,289,914 | 3/1994 | Holmgren | 206/1.5 |
| 5,368,162 | 11/1994 | Holmgren | 206/387.11 |

FOREIGN PATENT DOCUMENTS

| | | | |
|---|---|---|---|
| 2486497 | 1/1982 | France | 206/1.5 |
| WO90/07183 | 6/1990 | WIPO . | |
| WO92/08026 | 5/1992 | WIPO . | |
| WO93/15294 | 8/1993 | WIPO | 70/57.1 |

Primary Examiner—Lloyd A. Gall
Attorney, Agent, or Firm—Merchant, Gould, Smith, Edell, Welter & Schmidt

[57] ABSTRACT

Safety device to be mounted on a parallelepipedic box comprises a frame (10) constructed to encircle the box and having an insert opening (11) for the box and a blocking element (13) displaceably and pivotably mounted to the frame, the blocking element being adjustable between a blocking position and an off position to prevent in the blocking position the box inserted into the frame from being withdrawn from the frame. A spring blade (22) clamped at one end thereof in the blocking element extends in the displacement path of the blocking element to engage at the other, free end thereof behind a shoulder (25) on the frame and thus to prevent displacement of the blocking element in the blocking position, wherein positive engagement is established between the blocking element and the frame in order to prevent the blocking element from pivoting. The spring blade can be actuated by external assembly in order to release the blocking element for adjustment to the off position by displacement or pivotal movement and thus allowing the box to be withdrawn from the frame through the insert opening.

6 Claims, 4 Drawing Sheets

SAFETY DEVICE FOR A BOX

BACKGROUND OF THE INVENTION

The invention relates to a safety device to be mounted on a parallelepipedic box, including e.g. CD boxes, music cassette boxes, video cassette boxes, and boxes for expensive small items such as jewelry, watches etc., but this exemplification is in no way exhausting because the safety device generally can be applied to boxes of all types.

The safety device according to the invention is of the type comprising a frame constructed to encircle the box and having an insert opening for the box, and a blocking element displaceably and pivotably mounted to the frame, said blocking element being adjustable between a blocking position and an off position to prevent in said blocking position the box inserted into the frame from being withdrawn from the frame, and a latch mechanism with a spring blade retaining the blocking element in the blocking position thereof, which spring blade can be actuated by external means in order to release the blocking element for adjustment to the off position by displacement and pivotal movement and thus allowing the box to be withdrawn from the frame through the insert opening.

The international application WO92/08026 describes a safety device of this kind wherein the blocking element, in the illustrative embodiment described therein, forms a hook and is held in the blocking position by the rotary bolt and a lock mechanism of the type disclosed in WO90/07183, when the rotary bolt is in the locking position thereof, latched in said position by the latch mechanism which can be actuated externally and comprises a spring blade which engages the rotary bolt and can be actuated by means of a magnet. In the locking position the rotary bolt engages an aperture in the blocking element and, as a consequence thereof, prevents displacement of the blocking element which clasps the box at the insert opening and in turn prevents withdrawal of the box from the frame. In the blocking position the blocking element cannot be pivoted because it is partly inserted under the lock mechanism preventing upward pivotal movement thereof.

SUMMARY OF THE INVENTION

The purpose of the invention is above all to provide a safer safety device than those proposed so far by avoiding projecting parts which tempt to mechanical breaking. Such projecting parts should be avoided and the safety device should cause a minimum increase of the outside measures of the box also for the reason that such increase may interfere with stacking of the boxes provided with the safety device, and with searching e.g. among CD boxes exposed in compartments. The purpose of the invention is, however, also to simplify the safety device structurally by reducing the number of parts in relation to present embodiments; the spring blade forming a part of the latch mechanism, engages the blocking element directly and not by the intermediary of a rotary bolt as in said lock mechanism, and the safety device can be manufactured with greater tolerances, which means that the safety device can be manufactured at lower costs. Moreover, the purpose of the invention is to simplify the function and handling of the safety device and to make it universally usable not only for rigid boxes but also for such boxes as are made of a softer material, e.g. cardboard. For example, the safety device described in WO92/08026 has been provided particularly for use with soft boxes which has resulted in a slightly more complicated safety device because the number of parts therein is relatively large. Moreover, a specific operation is necessary when handling the safety device because the rotary bolt has to be actuated after the latch mechanism having been brought to off position in order then to bring the blocking element to off position. This operation will be avoided if the latch mechanism engages directly the blocking element.

In order to achieve this purpose the safety device according to the invention has obtained the characterizing features of claim 1.

BRIEF DESCRIPTION OF THE DRAWINGS

In order to explain the invention in more detail an embodiment thereof will be described below reference being made to the accompanying drawings, in which.

DETAILED DESCRIPTION OF THE PREFERRED EMBODIMENT

Figure 1:
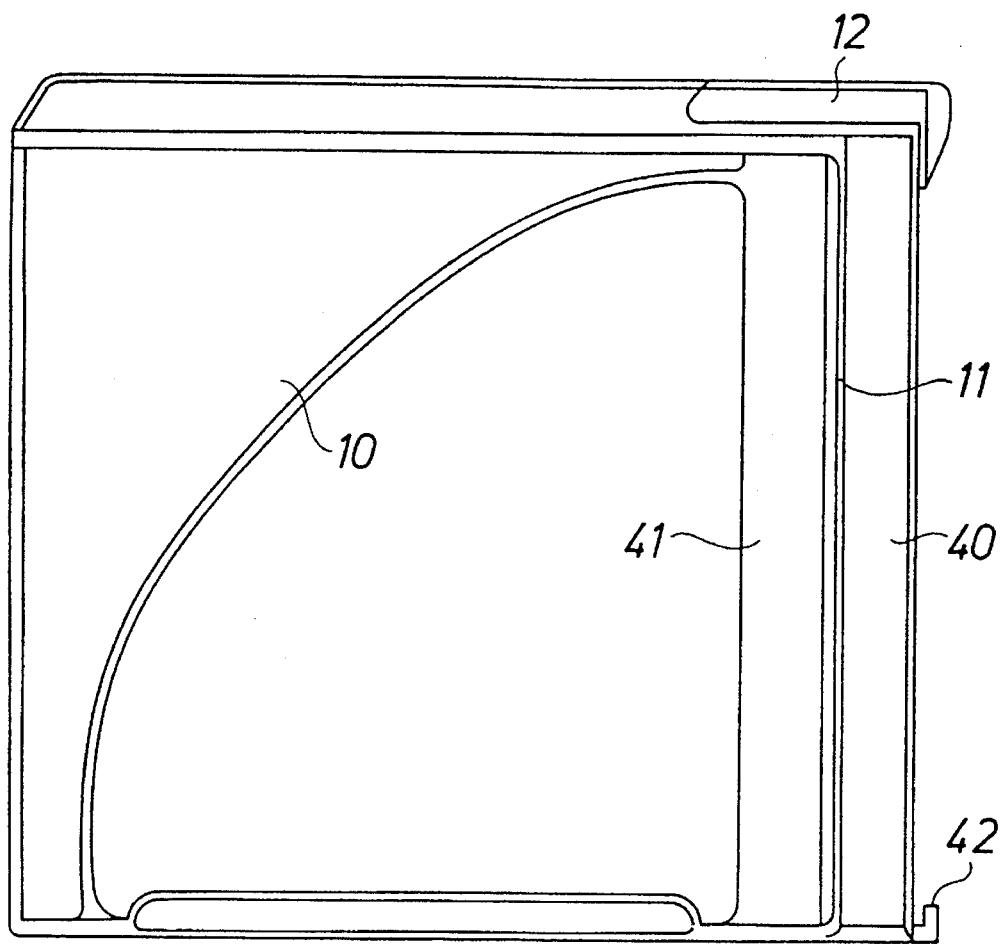
FIG. 1 is a side view of a safety device according to the invention.
Figure 2:
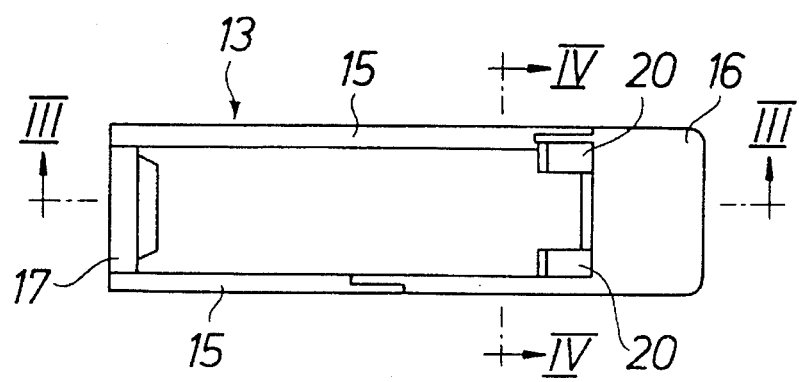
FIG. 2 is a top plan view of the displaceable and pivotable blocking element forming part of the safety device.
Figure 3:
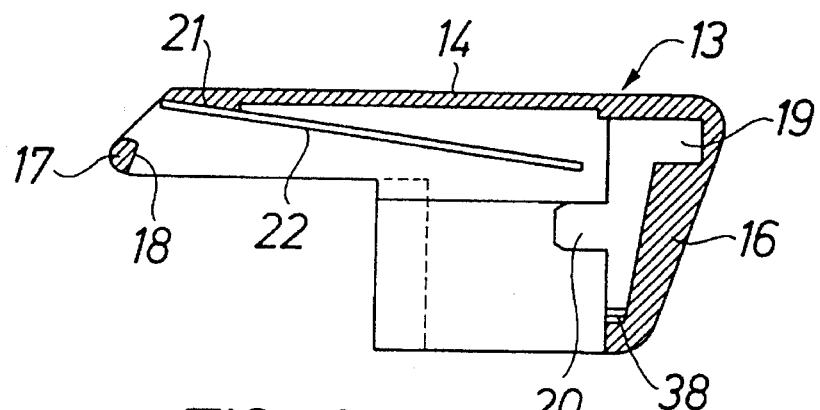
FIG. 3 is a longitudinal cross sectional view along line III—III in FIG. 2.
Figure 4:
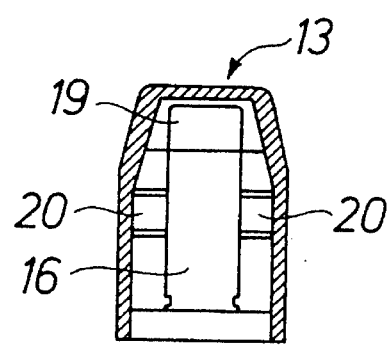
FIG. 4 is a cross sectional view along line IV—IV in FIG. 2.
Figure 5:
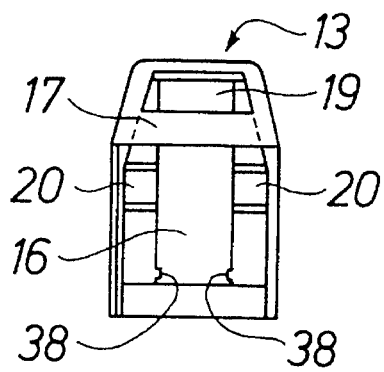
FIG. 5 is an end view of the blocking element as seen from the left in FIG. 3.

The safety device shown in FIG. 1 comprises a sturdy frame 10 of injection molded durable plastics, e.g. polycarbonate, and is constructed to receive a parallelepipedic box therein which in the present case is assumed to be a CD box, in order to embrace said box at the flat sides and three edge sides thereof the fourth edge side forming an insert opening 11 for insertion of the box into the frame and for withdrawal of the box therefrom. In a manner known per se and not shown herein the frame should be provided with a sensor comprising a dipole or a tape for influence on an electronic alarm system. Sensors of different types are known per se and the purpose thereof is to disturb an electrostatic or magnetic field when the sensors are being carried through such field maintained between two bows bounding a passage in the exit of a shop or a department store, an alarm device being activated via electronic circuits by such disturbance. This theft prevention technique is well known per se. On one edge side of the frame there is provided a device 12 for blocking the insert opening.

The blocking device 12 comprises a blocking element 13 formed as a hook in this embodiment, which is injection molded of the same plastics as the frame and has a U-shaped cross section with a web 14 and two side walls 15 as well as a relatively sturdy end wall 16. Between the side walls 15 and the end of the blocking element which is opposite to the end wall 16, a pin 17 is provided which is cylindrical but is cut to form a flat surface 18. A central recess 19 is provided in the end wall 16, and two projections 20 forming bevelled edges at the ends thereof are formed at the side walls. A spring blade 22 which is rectilinear when not actuated and consists of a material which can be attracted by a magnet is attached to a side surface 21 at the end of the blocking element where the pin 17 is provided, and this spring blade extends through the blocking element to a position adjacent the recess 19. The spring blade can be attached by ultrasound welding.

A central longitudinal rib 23 is provided on the frame 10 and terminates in a projection 24 projecting from the frame, a shoulder 25 being provided on the upper side of the rib 23. A hook 26, the upper surface of which is flush with the upper surface of the rib 23 and together with the rib defines a gap 27, also bounds an opening at a bevelled surface 28 together with a bevelled surface 29 on a boss 30 on the frame, said opening connecting the gap 27 with a slot 31 defined below the hook 26. The opening bounded by the bevelled surfaces 28 and 29 tapers from the gap 27 towards the slot 31. The blocking element can be inserted into the gap 27 at the pin 17 and then can be moved from the gap between the bevelled surfaces 28 and 29 into the slot 31, the hook 26 yielding resiliently outwards, which implies, of course, that the plastics of the frame is of such character that the hook 26 can yield resiliently outwards. The pin 17 can be reciprocated in the slot 31 but is prevented from leaving the slot by the flat surface 18 engaging two shoulders 32 and 33 formed by the hook 26 and the boss 30, respectively, because the hook 26 hardly can be cammed away by the pin at said shoulders. The pin 17 allows the blocking element not only to be displaced but also to be pivoted up and down.

Figure 6:
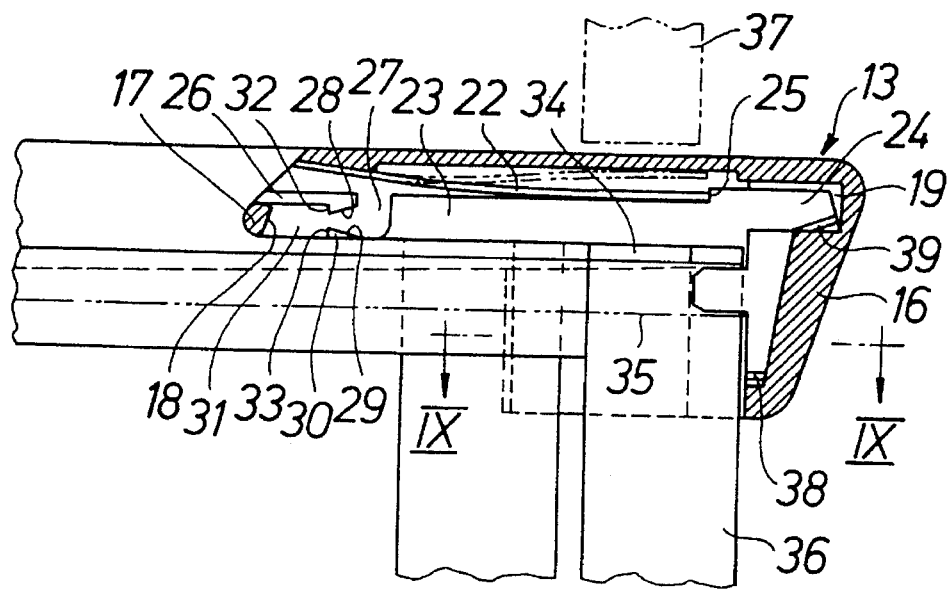
FIG. 6 is a fragmentary longitudinal cross sectional view of the safety device in the region of the blocking element shown in the blocking position.
Figure 7:
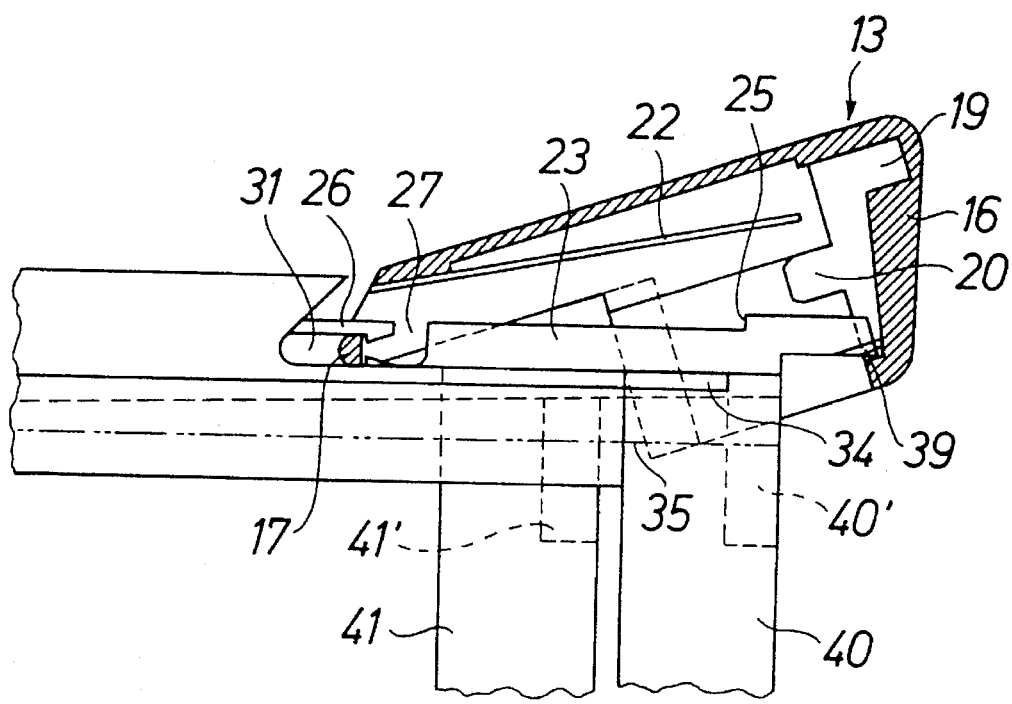
FIG. 7 is a corresponding fragmentary view as in FIG. 6 with the blocking element shown in off position.
Figure 8:
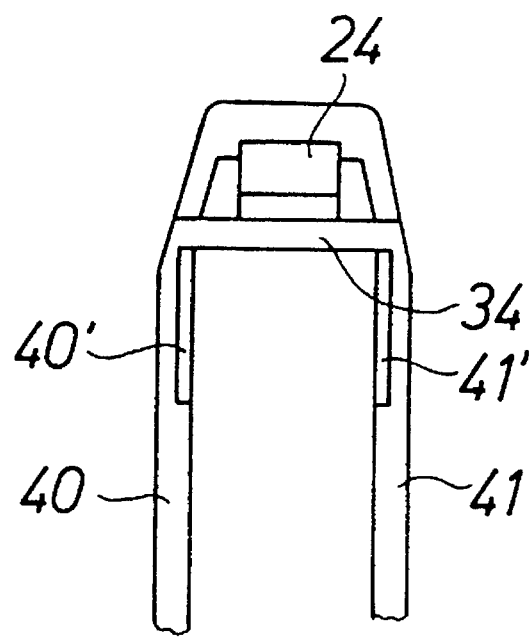
FIG. 8 is an end view of the frame in said region as seen from the right in FIGS. 6 and 7 with the blocking element being removed.

The blocking element can be adjusted by displacement and pivotal movement between a blocking position shown in FIG. 6 and an off position shown in FIG. 7.

In the blocking position according to FIG. 6 the blocking element is swung down and is displaced to a position wherein the pin 17 is located at the left end of the slot 31. Then, the projection 24 is received by the recess 19, which prevents the blocking element from upward pivotal movement, and moreover the projections 20 are located between the upper bounding surface 34 of the frame 10 and a CD box inserted into the frame. Said box when resting on the opposite lower wall of the frame has the upper edge surface thereof at the dot-and-dash lines 35 shown in FIGS. 6 and 7. The end wall 16 extends downwards a distance along the edge surface 36 of the CD box which is located at the insert opening 11. With the blocking element in this position the corner between the edge surfaces 35 and 36 of the CD box is covered by the two side walls 15 of the blocking element, said side walls in this region being extended downwards to terminate at the lower end of the end wall 16. The blocking element is maintained in the blocking position shown in FIG. 6 by the spring blade 22 which in this position presses against the flat upper surface of the rib 23 and has the free end thereof close to the shoulder 25, displacement of the blocking element from the position in FIG. 6 being prevented by positive engagement between the spring blade and the shoulder. The blocking element thus cannot be displaced and pivoted to the off position as long as the spring blade 22 engages the shoulder 25; it is safely maintained in the blocking position according to FIG. 6 wherein the CD box cannot be displaced from the frame 10 through the insert opening 11 because this is prevented by the hook-shaped blocking element by the engagement thereof with the corner portion of the CD box.

In order to release the CD box for withdrawal from the frame 10 it is necessary to bring the blocking element to the off position according to FIG. 7, which cannot be effected until the spring blade has been actuated by means of a strong magnet, a permanent magnet or an electromagnet, which is moved from the outside against the blocking element as indicated by dot-and-dash lines 37 in FIG. 6, the spring blade 22 being attracted by the magnet and being bent upwards to the position shown by dot-and-dash lines in FIG. 6, wherein the free end of the spring is disengaged from the shoulder 25. The blocking element can now be displaced to the right as seen in FIG. 6 the projection 24 being withdrawn from the recess 19 and the projections 20 at the same time being moved from the position below the wall 34, which means that the blocking element can now be pivoted to the off position shown in FIG. 7 wherein the opening 11 no longer is blocked and the CD box can be withdrawn finally from the frame 10 through the insert opening 11. The displacement and pivotal movement of the blocking element can be effected by means of the magnet 37 because the spring blade 22 and thus the blocking element in its entirety will be carried along by the magnetic attraction of the spring blade 22 to the magnet 37.

In order to arrest the blocking element in the raised position there are provided on the blocking element two teeth 38 engaging grooves 39 on the sides of the projection 24.

The use of the magnet in order to disengage the spring blade 22 from the shoulder 25 is preferred but it is also possible to move the spring blade away purely mechanically by means of a key-like member inserted through an aperture in the blocking element and engaged with the spring blade by insertion into an aperture therein.

Figure 9:
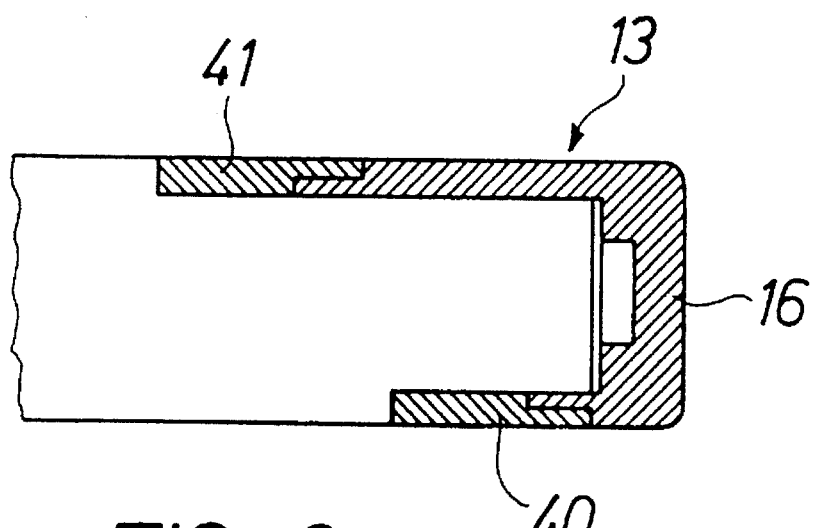
FIG. 9 is a fragmentary cross sectional view along line IX—IX in FIG. 6.

In a manner known per se the insert opening 11 is bounded by two strips 40 and 41 integral with the frame 10 and displaced in relation to each other and, therefore, the downwardly extended portion of one side wall 15 of the blocking element is longer than the other side wall in order that the side walls at the rear edge can be inserted into a recess 40' and 41', respectively, in the strips 40 and 41, respectively. For this purpose the thickness of the side walls is reduced by 50% at the overlapping portions as shown in FIG. 9. The side walls overlap the strips at the inside thereof, breaking of the blocking element at the side walls being made more difficult by this arrangement.

At the bottom of the frame of the edge which is opposite to the blocking device 12 there can be provided a threshold 42 over which the CD box must be passed when inserted into the frame through the insert opening. This makes removal of the CD box from the frame still more difficult because this can take place only by the box being lifted over the threshold if somebody tries to release the blocked CD box in deforming the frame by bending. The threshold can be a supplement to the hook on the blocking element but it is also possible to provide a safety satisfying practical needs by having the hook-shaped blocking element only—thus no threshold—or to have the threshold 42 and to exclude the portion of the side wall of the blocking element which extends downwards over the CD box, the end wall 16 of the blocking element thus terminating flush with the the lower surface of the projection 20. However, the greatest possible safety will be obtained by having both a threshold and a hook-shaped blocking element.

In the embodiment described the spring blade 22 is attached to the blocking element 13 to engage the shoulder 25 provided on the frame 10 but it is also possible to attach the spring blade to the frame and to have the spring blade engaging a shoulder on the blocking element.

I claim:

1. A safety device for a box, comprising:
   a frame, said frame being adapted to conform to dimensions of the box, said frame including an insert opening for inserting the box in the frame;
   a blocking element for blocking the insert opening, the blocking element being movable between a first engaged position, where the insert opening is blocked, and a second disengaged position where the insert opening is not blocked;
   means for slidably and pivotally mounting the blocking element to said frame, said mounting means being connected to said frame;
   restraining means for preventing pivotal movement of the blocking element when the blocking element is in the first engaged position, the restraining means being connected to the frame;
   a latch operatively connected to the blocking element for selectively releasing the blocking element, the latch being movable between a first position where the blocking element cannot be displaced and remains engaged, whereby the insert opening is blocked, and a second position where the blocking element can be displaced and disengaged, whereby the insert opening is unblocked; and
   wherein said latch comprises:
      a spring blade fixedly attached at one end thereof to the blocking element; and
      a shoulder on said frame, said spring blade engaging said shoulder in said first position thereof to prevent sliding motion of said blocking element.

2. Safety device as in claim 1 wherein the blocking element is hook-shaped to clasp the box in said first engaged position to prevent withdrawal of the box from the frame.

3. Safety device as in claim 1 further comprising a threshold provided on the frame to prevent withdrawal of the box from the frame with the blocking element in said first engaged position, said blocking element and said threshold being provided at opposite sides of the insert opening.

4. Safety device as in claim 1 wherein said restraining means comprises a projection on said frame to be engaged by the blocking element in said first engaged position thereof.

5. Safety device as in claim 1 wherein said restraining means comprises a projection on said blocking element to be engaged with a surface on the frame in said first engaged position of said blocking element.

6. Safety device as in claim 1 further comprising interengaging arresting means on the frame and the blocking element for arresting the blocking element in said second disengaged position.

* * * * *